(12) United States Patent
Luo et al.

(10) Patent No.: US 12,411,818 B2
(45) Date of Patent: Sep. 9, 2025

(54) METHOD AND APPARATUS OF COMPARING DATA OF HETEROGENEOUS DATA SOURCES, DEVICE, AND STORAGE MEDIUM

(71) Applicant: Beijing Volcano Engine Technology Co., Ltd., Beijing (CN)

(72) Inventors: Zhao Luo, Beijing (CN); Fengtian Wang, Beijing (CN); Shaozhong He, Beijing (CN); Zezhong Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/955,901

(22) Filed: Nov. 21, 2024

(65) Prior Publication Data
US 2025/0190404 A1    Jun. 12, 2025

(30) Foreign Application Priority Data

Dec. 6, 2023 (CN) .......................... 202311666657.7

(51) Int. Cl.
| G06F 7/00 | (2006.01) |
| G06F 16/21 | (2019.01) |
| G06F 16/25 | (2019.01) |
| G06F 16/27 | (2019.01) |

(52) U.S. Cl.
CPC .......... *G06F 16/211* (2019.01); *G06F 16/258* (2019.01); *G06F 16/27* (2019.01)

(58) Field of Classification Search
CPC ....... G06F 16/211; G06F 16/27; G06F 16/258
USPC .................................. 707/600–899; 709/219
See application file for complete search history.

(56) References Cited

U.S. PATENT DOCUMENTS

2023/0113635 A1* 4/2023 Borhade ............... G06F 16/215
707/692

\* cited by examiner

*Primary Examiner* — Isaac M Woo

(57) ABSTRACT

The present disclosure discloses a method and apparatus of comparing data of heterogeneous data sources, a device, and a storage medium. The method includes: obtaining first metadata and second metadata corresponding to heterogeneous data sources to be compared; determining a data isomorphism benchmark from the heterogeneous data sources based on the first metadata and the second metadata, and determining a first target data table and a second target data table corresponding to the heterogeneous data sources; associating the first target data table with the second target data table to determine a comparison indicator of the heterogeneous data sources; determining, based on the first target data table and the second target data table, a target comparison manner between the first target data table and the second target data table; and generating a data comparison result corresponding to the comparison indicator.

17 Claims, 4 Drawing Sheets

METHOD AND APPARATUS OF COMPARING DATA OF HETEROGENEOUS DATA SOURCES, DEVICE, AND STORAGE MEDIUM

CROSS-REFERENCE TO RELATED APPLICATION

This application claims priority to Chinese Application No. 202311666657.7 filed on Dec. 6, 2023, the disclosure of which is incorporated herein by reference in its entity:

FIELD

The present disclosure relates to the field of data processing, and in particular, to a method and apparatus of comparing data of heterogeneous data sources, a device, and a storage medium.

BACKGROUND

At present, in the data warehouse research and development process, there are more and more data sources, and the comparison cost of different data sources is very high. This will lead to insufficient data testing, and data quality becomes a great risk.

SUMMARY

In view of the above, embodiments of the present disclosure provide a method and apparatus of comparing data of heterogeneous data sources, a device, and a storage medium.

In a first aspect, an embodiment of the present disclosure provides a method of comparing data of heterogeneous data sources, comprising: obtaining first metadata and second metadata corresponding to the heterogeneous data sources to be compared: determining a data isomorphism benchmark from the heterogeneous data sources based on the first metadata and the second metadata, and determining a first target data table and a second target data table corresponding to the heterogeneous data sources: associating the first target data table with the second target data table to determine a comparison indicator of the heterogeneous data sources; determining, based on the first target data table and the second target data table, a target comparison manner between the first target data table and the second target data table; and generating, according to the target comparison manner and the data isomorphism benchmark, a data comparison result corresponding to the comparison indicator.

In a second aspect, an embodiment of the present disclosure provides an apparatus of comparing data of heterogeneous data sources, comprising: an obtaining module, configured to obtain first metadata and second metadata corresponding to heterogeneous data sources to be compared: a data information determining module, configured to determine a data isomorphism benchmark from the heterogeneous data sources based on the first metadata and the second metadata, and determine a first target data table and a second target data table corresponding to the heterogeneous data sources: an indicator determining module, configured to associate the first target data table with the second target data table to determine a comparison indicator of the heterogeneous data sources: a comparison manner determining module, configured to determine, based on the first target data table and the second target data table, a target comparison manner between the first target data table and the second target data table; and a result generation module, configured to generate, according to the target comparison manner and the data isomorphism benchmark, a data comparison result corresponding to the comparison indicator.

In a third aspect, an embodiment of the present disclosure provides a computer device, comprising: a memory and a processor, communicatively connected to each other, wherein the memory stores computer instructions, and the processor executes the computer instructions to perform the method of comparing data of heterogeneous data sources according to the first aspect or any one of the corresponding embodiments thereof.

In a fourth aspect, an embodiment of the present disclosure provides a computer-readable storage medium, storing computer instructions thereon, the computer instructions being configured to cause a computer to perform the method of comparing data of heterogeneous data sources according to the first aspect or any one of the corresponding embodiments of the first aspect.

BRIEF DESCRIPTION OF THE DRAWINGS

In order to more clearly describe the specific embodiments of the present disclosure or the technical solutions in the prior art, the following briefly introduces the accompanying drawings required for describing the specific embodiments or the prior art. Apparently, the accompanying drawings in the following description show some embodiments of the present disclosure. For those of ordinary skill in the art, other drawings can be derived from these drawings without creative efforts.

DETAILED DESCRIPTION OF EMBODIMENTS

Figure 1:
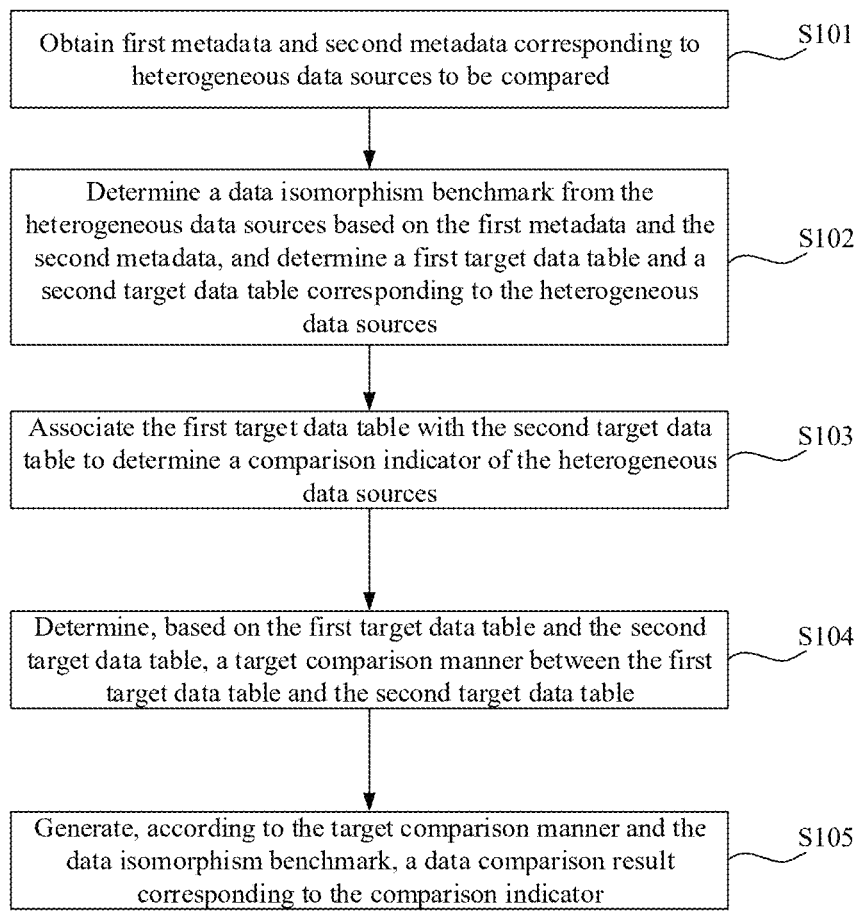
FIG. 1 is a schematic flowchart of a method of comparing data of heterogeneous data sources according to some embodiments of the present disclosure.

To make the objectives, technical solutions, and advantages of the embodiments of the present disclosure clearer, the technical solutions in the embodiments of the present disclosure will be described clearly and completely with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Generally, data from different storages is heterogeneous, and the data structures between each other are quite different. At present, the comparison between heterogeneous data sources is completed mostly by manual, which results in very low data comparison efficiency. Although there are some automated comparison test tools, they only achieve partial automation, specifically as follows:

(1) They lack automatic cleaning and conversion of different data sources. This part of work still needs to be completed manually. For example, the manta comparison tool implements the comparison test function of two Hive tables, but cannot implement the comparison between a Kafka message queue and a Hive table. Because the Kafka message queue is in a JSON or PB format, and the Hive table is a two-dimensional table structure, the data of the Kafka message queue needs to be synchronized to the Hive table manually before subsequent data comparison work can be performed.

(2) Different data sources have different update frequencies, resulting in inaccurate data comparison results. For example, data of Kafka. ClickHouse, and ABase is updated in real time, while the Hive table is updated daily or hourly, which increases the implementation cost of data comparison, and it is difficult to ensure the accuracy of data comparison results. At present, it mainly relies on manual processing.

(3) They lack a unified data comparison template and evaluation indicator. For example, a data test toolkit is implemented based on Python, which uniformly encapsulates the read APIs of different storage components to simplify the reading cost. Although the workload of users in reading data is reduced, heterogeneous data sources still need to be cleaned and converted based on the API provided by the toolkit, and the code of the comparison indicator is written manually.

Based on this, the method of comparing data of heterogeneous data sources provided in this embodiment of the present disclosure determines a data isomorphism benchmark by analyzing metadata of the heterogeneous data sources, performs data processing on different data sources in the heterogeneous data sources based on the data isomorphism benchmark to generate corresponding target data tables, and then associates different target data tables to automatically determine a required comparison indicator and an adapted target comparison manner, thereby implementing data comparison of heterogeneous data sources according to the target comparison manner and generating a corresponding data comparison result. In this way, fully automatic data comparison testing is implemented without relying on manual work, thereby saving labor costs. In addition, through automatic data comparison, data comparison efficiency is improved, errors in manual comparison are reduced, and data comparison accuracy is improved.

The technical solution of the present disclosure performs standardized format conversion on the data source in combination with the metadata, and sets data comparison watermarks of an online comparison manner and an offline comparison manner to implement data alignment of heterogeneous data sources. Through asynchronous monitoring of the data comparison watermarks, data within the data comparison watermarks is compared to ensure idempotency of results. In addition, a universal data template format is combined to automatically generate a comparison indicator. In this way, fully automatic data comparison testing is implemented, data comparison efficiency is improved, errors in manual comparison are reduced, and data comparison accuracy is further improved.

According to an embodiment of the present disclosure, an embodiment of a method of comparing data of heterogeneous data sources is provided. It should be noted that the steps shown in the flowcharts of the accompanying drawings may be executed in a computer system such as a set of computer-executable instructions, and although a logical order is shown in the flowcharts, the steps shown or described may be executed in an order different from that herein in some cases.

In this embodiment, a method of comparing data of heterogeneous data sources is provided, which can be used in a computer device, such as a computer, a notebook computer, a server, etc. FIG. 1 is a flowchart of a method of comparing data of heterogeneous data sources according to an embodiment of the present disclosure. As shown in FIG. 1, the process includes the following steps:

Step S101: Obtain first metadata and second metadata corresponding to heterogeneous data sources to be compared.

The heterogeneous data sources are two data sources with different data structures stored in a data warehouse, that is, the heterogeneous data sources are two different data sources, and the two different data sources are different in data storage structure. For example, a Kafka message queue and a Hive table, the data structure of the Kafka message queue is JSON or PB, and the data structure of the Hive table is a two-dimensional table.

The metadata is descriptive information corresponding to data in the data source, and specifically includes description of attributes, features, structures, sources, formats, etc. of the data. The first metadata and the second metadata are metadata corresponding to two different data sources, respectively.

When data of any heterogeneous data sources in the data warehouse needs to be compared, the computer device may obtain two data source identification information corresponding to the heterogeneous data sources, and retrieve data sources matched with the two data source identification information from the data warehouse by accessing the data warehouse, that is, the heterogeneous data sources to be compared. The heterogeneous data sources to be compared may come from different components in the data warehouse, or may come from the same component. This is not specifically limited here.

Step S102: Determine a data isomorphism benchmark from the heterogeneous data sources based on the first metadata and the second metadata, and determine a first target data table and a second target data table corresponding to the heterogeneous data sources.

The data isomorphism benchmark is used to represent a reference data structure for implementing data comparison. The data description information represented by the first metadata and the second metadata are compared, and one data source is selected from the heterogeneous data sources as the data isomorphism benchmark based on a comparison result, and the data structure of the other data source is converted to make the data structure consistent with the data format of the data source as the data isomorphism benchmark.

The target data table is used to represent the data storage structure of the data source, that is, a data table generated by storing data according to the data storage structure. The metadata includes descriptive information such as data source type, field, storage format, update frequency; and data amount. Therefore, the first target data table may be generated in combination with the first metadata, and the second target data table may be generated in combination with the second metadata.

In a specific example, the heterogeneous data sources are a data source 1 and a data source 2. After metadata comparison, the data source 1 is used as the data isomorphism benchmark, and the data structure of the data source 2 is converted to be consistent with that of the data source 1.

Then, the first target data table corresponding to the data source 1 and the second target data table corresponding to the data source 2 have a consistent data structure.

For example, the first target data table is a Hive table, and the second target data table is also a Hive table. Data in the data source 1 is stored according to the Hive table structure based on the first metadata, to generate the first target data table corresponding to the data source 1. Meanwhile, data in the data source 2 is stored according to the Hive table structure based on the second metadata, to generate the second target data table corresponding to the data source 2.

Step S103: Associate the first target data table with the second target data table to determine a comparison indicator of the heterogeneous data sources.

The comparison indicator is an indicator for which data comparison needs to be performed this time, for example, a video playback difference amount, a commodity order difference amount, etc. By associating the two data sources in the heterogeneous data sources, data associating may be performed on the first target data table and the second target data table corresponding to the two data sources in combination with an association relationship between the heterogeneous data sources, and the same indicator data in the first target data table and the second target data table is compared, to represent the comparison indicator by using a difference value of the same indicator data.

For example, the first target data table corresponding to the data source 1 in the heterogeneous data sources is:

| commodity identifier | order amount |
|---|---|
| 001 | 100 |
| 002 | 200 |

The second target data table corresponding to the data source 2 in the heterogeneous data sources is:

| commodity identifier | order amount |
|---|---|
| 001 | 90 |
| 002 | 200 |

After the data source 1 and the data source 2 are associated, data associating may be performed on the first target data table and the second target data table corresponding to the two data sources to generate an associated data table as follows:

| commodity identifier | order amount of data source 1 | order amount of data source 2 | order difference amount |
|---|---|---|---|
| 001 | 100 | 90 | 10 |
| 002 | 200 | 200 | 0 |

The comparison indicator (that is, order difference amount) between the first target data table and the second target data table may be determined by comparing and calculating the order amount. The order difference information existing in different data sources may be screened out based on the order difference amount.

Step S104: Determine, based on the first target data table and the second target data table, a target comparison manner between the first target data table and the second target data table.

The target comparison manner is used to represent a data comparison manner used between the first target data table and the second target data table. Specifically, the data comparison manner may include an offline comparison manner and an online comparison manner. The offline comparison manner is applicable to a data table with a larger data amount or a slower data update frequency; that is, a data table with low requirements for real-time performance. The online comparison manner is applicable to a data table with a small data amount or a fast data update frequency, that is, a data table with high requirements for real-time performance.

The first target data table and the second target data table are data tables adapted to the metadata, and the metadata describes attribute information such as data update frequency and data amount. Therefore, the applicable data comparison manner may be determined based on the data structures of the first target data table and the second target data table.

Step S105: Generate, according to the target comparison manner and the data isomorphism benchmark, a data comparison result corresponding to the comparison indicator.

The comparison reference information between two different data sources, for example, a data comparison watermark, a data comparison time, etc., may be determined in combination with the data isomorphism benchmark. After the comparison reference information is determined, data comparison is performed on the first target data table and the second target data table based on the comparison reference information and the target comparison manner in combination with the comparison indicator between the first target data table and the second target data table, to generate a data comparison result corresponding to the comparison indicator.

The method of comparing data of heterogeneous data sources provided in this embodiment determines a data isomorphism benchmark by analyzing metadata of the heterogeneous data sources, performs data processing on different data sources in the heterogeneous data sources based on the data isomorphism benchmark to generate corresponding target data tables, and then associates different target data tables to automatically determine a required comparison indicator and an adapted target comparison manner, thereby implementing data comparison of heterogeneous data sources according to the target comparison manner and generating a corresponding data comparison result. In this way, fully automatic data comparison testing is implemented without relying on manual work, thereby saving labor costs. In addition, through automatic data comparison, data comparison efficiency is improved, errors in manual comparison are reduced, and data comparison accuracy is improved.

Figure 2:
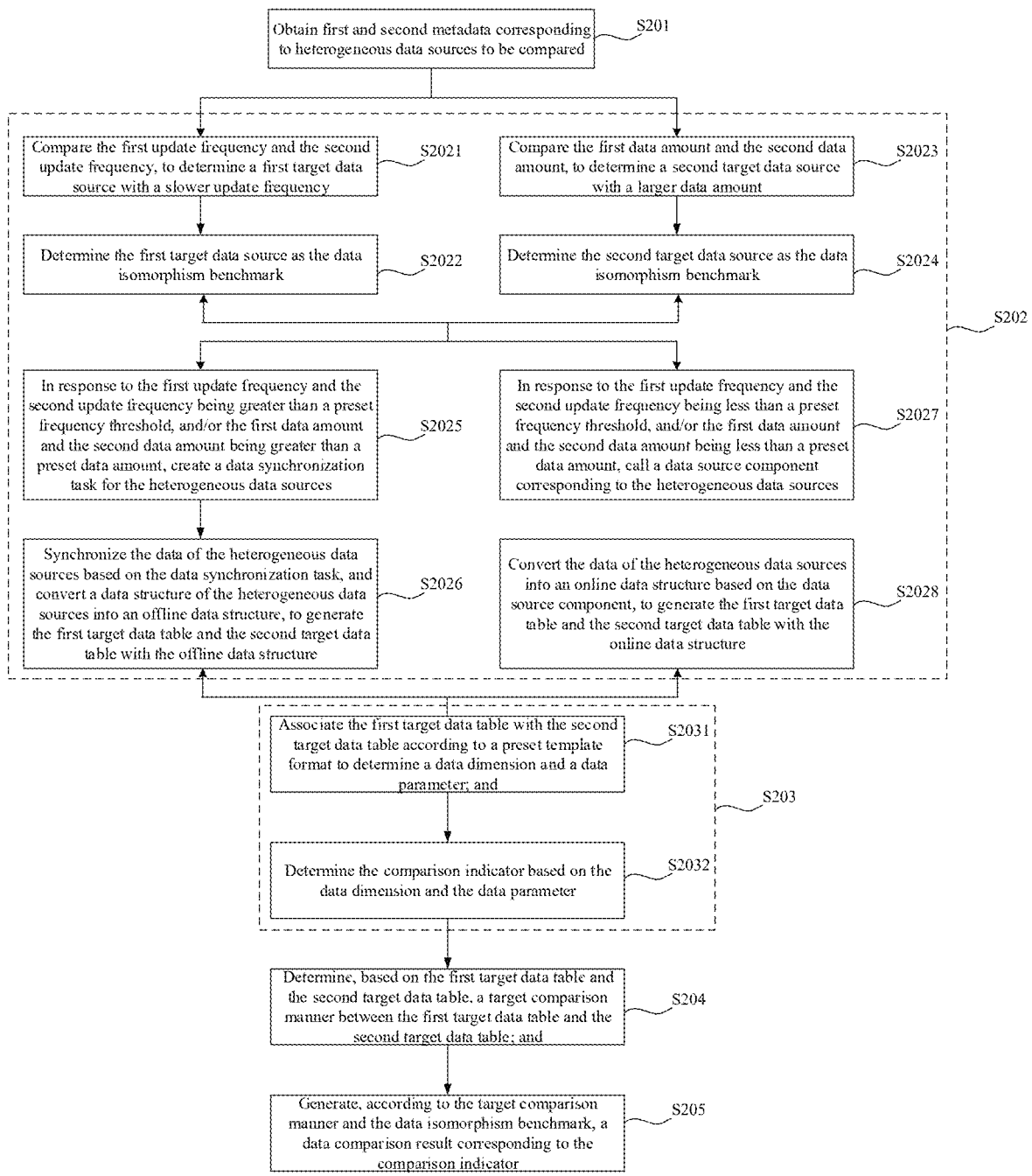
FIG. 2 is a schematic flowchart of another method of comparing data of heterogeneous data sources according to some embodiments of the present disclosure.

In this embodiment, a method of comparing data of heterogeneous data sources is provided, which can be used in a computer device, such as a computer, a notebook computer, a server, etc. FIG. 2 is a flowchart of a method of comparing data of heterogeneous data sources according to an embodiment of the present disclosure. As shown in FIG. 2, the process includes the following steps:

Step S201: Obtain first metadata and second metadata corresponding to heterogeneous data sources to be compared. For a detailed description, refer to the related description of the corresponding step in the above embodiment, which will not be repeated here.

Step S202: Determine a data isomorphism benchmark from the heterogeneous data sources based on the first metadata and the second metadata, and determine a first target data table and a second target data table corresponding to the heterogeneous data sources.

Specifically, the first metadata comprises a first update frequency and a first data amount, and the second metadata comprises a second update frequency and a second data amount. As mentioned above, the heterogeneous data sources are two data sources with different data structures, the first update frequency represents a data update frequency of one of the data sources, the second update frequency represents a data update frequency of the other data source, the first data amount represents a data update amount of one of the data sources, and the second data amount represents a data update amount of the other data source.

Accordingly; step S202 may include the following steps:

Step S2021: Compare the first update frequency and the second update frequency; to determine a first target data source with a slower update frequency.

The first update frequency is compared with the second update frequency to determine a frequency size relationship between the first update frequency and the second update frequency, and a slower update frequency is determined from the first update frequency and the second update frequency. A data source with a slower update frequency is determined as the first target data source.

For example, the first update frequency corresponding to the data source 1 is one hour, and the second update frequency corresponding to the data source 2 is ten minutes. Then, the data source 1 is used as the first target data source.

Step S2022: Determine the first target data source as the data isomorphism benchmark.

Because the update frequency of the first target data source is slower, to ensure data comparison accuracy; the first target data source is determined as the data isomorphism benchmark, to perform data comparison according to the data update frequency of the first target data source.

Step S2023: Compare the first data amount and the second data amount, and determine a second target data source with a large data amount.

The first data amount is compared with the second data amount to determine a data amount size relationship between the first data amount and the second data amount, and a large data amount is determined from the first data amount and the second data amount. A data source with a large data amount is determined as the second target data source.

For example, the first data amount corresponding to the data source 1 is 1 G. and the second data amount corresponding to the data source 2 is 100 M. Then, the data source 1 is used as the second target data source.

Step S2024: Determine the second target data source as the data isomorphism benchmark.

Because the data update amount of the second target data source is large, to avoid affecting data comparison efficiency and data accuracy due to a large amount of data conversion, the second target data source is determined as the data isomorphism benchmark, to convert the data structure of the other data source into the data structure of the second target data source, to implement effective comparison between data.

Step S2025: When the first update frequency and the second update frequency are greater than a preset frequency threshold, and/or the first data amount and the second data amount are greater than a preset data amount, create a data synchronization task for the heterogeneous data sources.

The preset frequency threshold is a preset threshold used to determine whether the update frequency is slower, for example, the preset frequency threshold may be ten minutes.

15 minutes, etc., which may be set according to actual requirements and is not specifically limited here.

When both the first update frequency and the second update frequency are greater than the preset frequency threshold, it is determined that the data update frequency of the heterogeneous data sources is slower. In this case, offline standardization processing may be performed on data in the heterogeneous data sources. Specifically, the data synchronization task may be automatically created in the background of the computer device to synchronize the data after the data is updated.

Step S2026: Synchronize data of the heterogeneous data sources based on the data synchronization task, convert a data structure of the heterogeneous data sources into an offline data structure, to generate the first target data table and the second target data table with the offline data structure.

When the data in the heterogeneous data sources is updated, the data synchronization task is executed to realize data synchronization. Because the data update frequency of the heterogeneous data sources is slower, data may be recorded in the offline data structure, for example, an offline Hive table. Specifically, when it is determined that the offline data structure is used, the data of the two data sources in the heterogeneous data sources is synchronized to the Hive table, and the data format is uniformly converted into the Hive table structure. In this way, two intermediate tables with the Hive table structure may be generated, that is, the first target data table and the second target data table.

Step S2027: When the first update frequency and the second update frequency are less than the preset frequency threshold, and/or the first data amount and the second data amount are less than the preset data amount, call a data source component corresponding to the heterogeneous data sources.

When both the first update frequency and the second update frequency are less than the preset frequency threshold, it is determined that the data update frequency of the heterogeneous data sources is fast. In this case, online standardization processing may be performed on data in the heterogeneous data sources. Specifically, the computer device may call a data source component API to perform standardized conversion on the data structure through the data source component API.

Step S2028: Convert data of the heterogeneous data sources into an online data structure based on the data source component, to generate the first target data table and the second target data table with the online data structure.

The data in the heterogeneous data sources is converted into the online data structure, for example, an SQL mode, by calling the data source component API. When the data in the heterogeneous data sources is updated, because the data update frequency of the heterogeneous data sources is fast, the data may be recorded in the online data structure. Specifically, when it is determined that the online data structure is used, the data of the two data sources in the heterogeneous data sources is converted into a standard SQL mode, to generate the first target data table and the second target data table with the SQL mode.

It should be noted that if one of the first update frequency and the second update frequency is greater than the preset frequency threshold, and the other is less than the preset frequency threshold, the first update frequency and the second update frequency are still compared, and a data source with a slower update frequency is used as the data isomorphism benchmark. For example, when the first update frequency is greater than the preset frequency threshold and the second update frequency is less than the preset frequency threshold, the data source corresponding to the first update frequency is used as the data isomorphism benchmark, and the heterogeneous data sources are converted into a two-dimensional table structure such as a Hive table to implement data comparison of the heterogeneous data sources.

If one of the first data amount and the second data amount is greater than the preset data amount, and the other is less than the preset data amount, the first data amount and the second data amount are still compared, and a data source with a large data amount is used as the data isomorphism benchmark. For example, when the first data amount is greater than the preset data amount and the second data amount is less than the preset data amount, the data source corresponding to the first data amount is used as the data isomorphism benchmark, and the heterogeneous data sources are converted into a two-dimensional table structure such as a Hive table to implement data comparison of the heterogeneous data sources.

Step S203: Associate the first target data table and the second target data table to determine a comparison indicator of the heterogeneous data sources.

Specifically, step S203 may include the following steps:

Step S2031: Associate the first target data table and the second target data table according to a preset template format to determine a data dimension and a data parameter.

The data dimension is used to represent different attributes or features in the data table that can be used to classify, group, or filter data, for example, a detailed dimension and a statistical dimension. The data parameter is a statistical parameter generated under the data dimension, for example, a commodity order amount and a video playback amount.

The preset template format is a preset data processing template. For example, data sources with different data structures are associated through an SQL processing template, so that the data dimension in the data table can be abstracted according to the preset template format to form a corresponding data model. In addition, data statistics are performed according to each data dimension to determine a data parameter corresponding to each data dimension.

Step S2032: Determine the comparison indicator based on the data dimension and the data parameter.

An absolute error statistics method and a dynamic threshold may be introduced into the data model formed by abstracting the data dimension to process the data parameter and generate a corresponding comparison indicator.

Here, the commodity order amount is taken as an example. If the first target data table is:

| commodity identifier | order amount |
|---|---|
| 001 | 100 |
| 002 | 200 |

The second target data table is:

| commodity identifier | order amount |
|---|---|
| 001 | 90 |
| 002 | 200 |

An executable SQL comparison task for the first target data table and the second target data table may be automatically generated through the SQL processing template, and the SQL comparison task is in a to-be-executed state. An associated data table is generated in combination with the SQL comparison task as follows:

| commodity identifier | order amount of data source 1 | order amount of data source 2 | order difference amount | absolute error |
|---|---|---|---|---|
| 001 | 100 | 90 | 10 | 0.1 |
| 002 | 200 | 200 | 0 | 0 |

The dynamic threshold is an error threshold set to filter desired data. For example, if a proportion of data with an absolute error of 0.1 is to be filtered, it may be determined that the proportion is 1/2=0.5. If a proportion of data with an absolute error of 0 is to be filtered, it may be determined that the proportion is 1/2=0.5. If a proportion of data with an absolute error greater than 0.1 is to be filtered, it may be determined that the proportion is 0/2=0.

Therefore, in combination with absolute error statistics and the dynamic threshold, the order amount of each data source may be processed to determine a currently required comparison indicator (for example, an order difference amount). Data is then filtered based on the comparison indicator to determine data that meets the filtering requirements.

It should be noted that, as a special case, only one data source may be read. In this case, the update frequency of the data source may be compared with the preset frequency threshold to determine whether to generate the target data table according to the offline data structure or the online data structure. Then, the generated target data table is processed according to the preset template format to automatically generate the comparison indicator, and single-source comparison is implemented through the comparison indicator.

Step S204: Determine, based on the first target data table and the second target data table, a target comparison manner between the first target data table and the second target data table. For a detailed description, refer to the related description of the corresponding step in the above embodiment, which will not be repeated here.

Step S205: Generate, according to the target comparison manner and the data isomorphism benchmark, a data comparison result corresponding to the comparison indicator. For a detailed description, refer to the related description of the corresponding step in the above embodiment, which will not be repeated here.

The method of comparing data of heterogeneous data sources provided in this embodiment determines the data isomorphism benchmark of the heterogeneous data sources in combination with the data update frequency or the data amount to implement data alignment of the heterogeneous data sources when the update frequencies of the heterogeneous data sources are different, thereby facilitating improving the accuracy of subsequent data comparison results. The data structures of the heterogeneous data sources are unified in combination with the data update frequency or the data amount to generate the corresponding first target data table and the corresponding second target data table, thereby facilitating data cleaning of the heterogeneous data sources and facilitating quick processing of data comparison. By associating the first target data table with the second target data table according to the preset template format, the data dimension of the target data table may be abstracted to automatically generate the comparison indicator, so that it is not necessary to set the comparison manually, and the automatic test process of data comparison is implemented to the greatest extent, and the uniformity of the comparison indicator is ensured, thereby avoiding the reliability of the comparison result being affected due to the non-uniformity of the comparison indicator.

Figure 3:
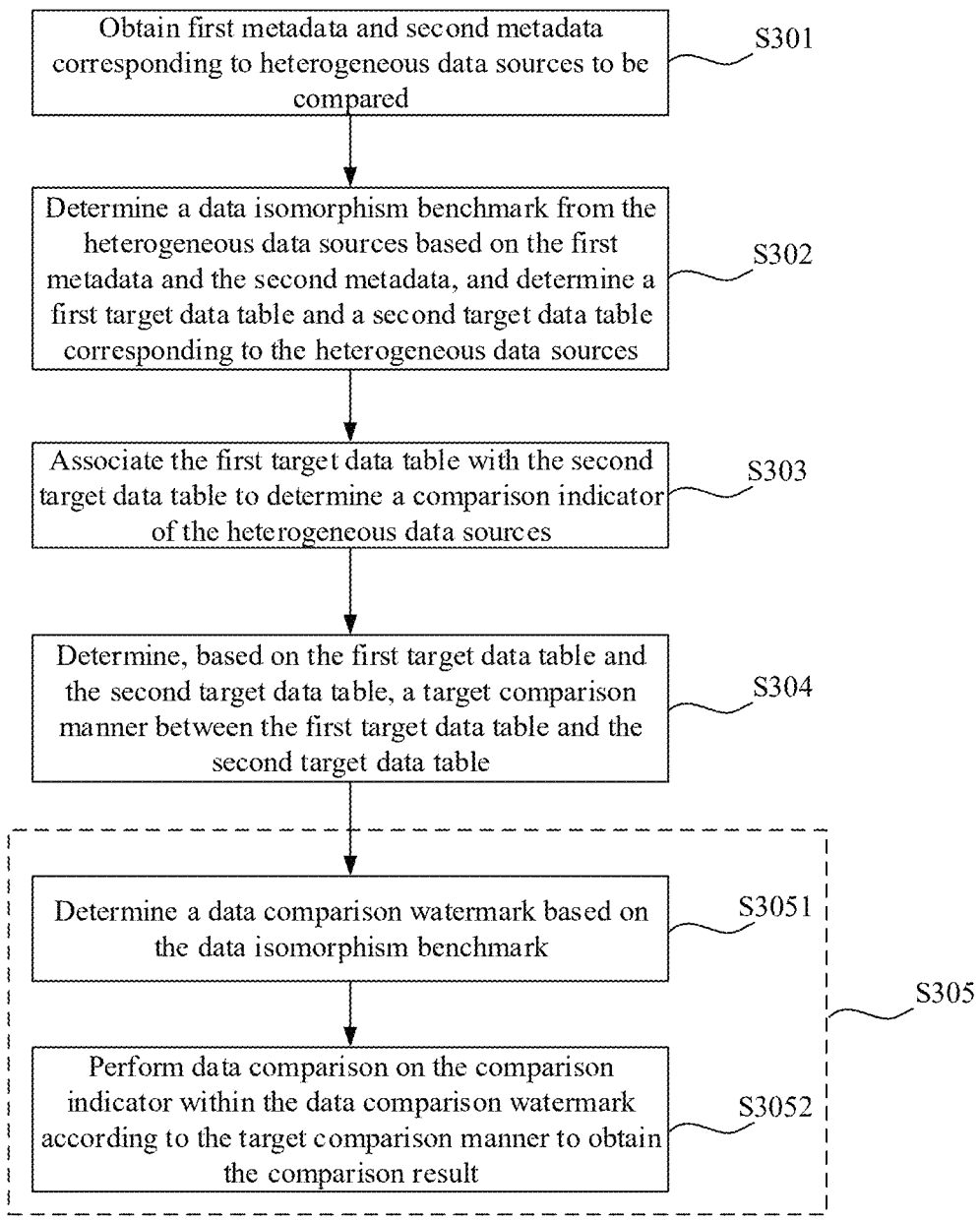
FIG. 3 is a schematic flowchart of still another method of comparing data of heterogeneous data sources according to some embodiments of the present disclosure.

In this embodiment, a method of comparing data of heterogeneous data sources is provided, which can be used in a computer device, such as a computer, a notebook computer, a server, etc. FIG. 3 is a flowchart of a method of comparing data of heterogeneous data sources according to an embodiment of the present disclosure. As shown in FIG. 3, the process includes the following steps:

Step S301: Obtain first metadata and second metadata corresponding to heterogeneous data sources to be compared. For a detailed description, refer to the related description of the corresponding step in the above embodiment, which will not be repeated here.

Step S302: Determine a data isomorphism benchmark from the heterogeneous data sources based on the first metadata and the second metadata, and determine a first target data table and a second target data table corresponding to the heterogeneous data sources. For a detailed description, refer to the related description of the corresponding step in the above embodiment, which will not be repeated here.

Step S303: Associate the first target data table with the second target data table to determine a comparison indicator of the heterogeneous data sources. For a detailed description, refer to the related description of the corresponding step in the above embodiment, which will not be repeated here.

Step S304: Determine, based on the first target data table and the second target data table, a target comparison manner between the first target data table and the second target data table. For a detailed description, refer to the related description of the corresponding step in the above embodiment, which will not be repeated here.

Step S305: Generate, according to the target comparison manner and the data isomorphism benchmark, a data comparison result corresponding to the comparison indicator.

Specifically: step S305 may include the following steps:

Step S3051: Determine a data comparison watermark based on the data isomorphism benchmark.

The comparison watermark represents a time watermark used for data comparison, and the data comparison watermark is determined by using the data isomorphism benchmark. For example, the data isomorphism benchmark is that data synchronization is completed at 15:00, and then the data comparison watermark is 15:00. The data isomorphism benchmark is to compare data once every 30 minutes, and then the 30-minute interval is used as the data comparison watermark.

Step S3052: Perform data comparison on the comparison indicator within the data comparison watermark according to the target comparison manner to obtain the comparison result.

The target comparison manner includes an offline comparison manner and an online comparison manner. When the online comparison manner is used, data to be compared is submitted to a Flink cluster for real-time computing through an online computing engine corresponding to the online comparison manner, and a data comparison result is also updated in real time. Specifically, the online computing engine uses a connector in the Flink cluster to separately read the first target data table and the second target data table, and asynchronously updates a current comparison watermark based on the data comparison watermark determined by using the data isomorphism benchmark to compare data within the data comparison watermark, to ensure result accuracy. For example, the 30-minute interval is used as the data comparison watermark, and real-time data is compared and the comparison result is updated at intervals of 30 minutes.

When the offline comparison manner is used, data to be compared is submitted to a Spark cluster for computing through an offline computing engine corresponding to the offline comparison manner, and the computing process may be performed once or triggered periodically according to actual requirements to generate a corresponding data comparison result. Specifically: the offline computing engine uses the Spark cluster to compare the first target data table and the second target data table that are synchronized, and determines a data comparison watermark for offline comparison based on the data isomorphism benchmark to compare data within the data comparison watermark, to ensure result accuracy: For example, data synchronization is completed at 21:00, and then the offline comparison this time only compares data before 21:00 to ensure the accuracy of data comparison results.

In some optional embodiments, when the target comparison manner is the online comparison manner and, after the comparison result is obtained, the method may further include the following steps:

Step a1: Detect whether the comparison result meets a preset condition.

Step a2: When the comparison result does not meet the preset condition, generate a real-time data monitoring alarm.

The preset condition is a preset monitoring and early warning threshold. That is, when it is detected that the comparison result exceeds the monitoring and early warning threshold, it indicates that there is an anomaly in data comparison. In this case, a monitoring alarm may be sent to enable technicians to perform data verification.

After the online computing engine completes data comparison this time and generates a comparison result, the computer device may compare the comparison result this time with the monitoring and early warning threshold set in the preset condition to determine whether the comparison result meets the preset condition. When the comparison result does not meet the preset condition, a real-time data monitoring alarm is generated to remind technicians to verify data of the data source.

In the above embodiment, whether the comparison result meets the monitoring and early warning threshold set in the preset condition is detected, to perform an alarm in time for an anomaly in data comparison, so that technicians can intervene in time to perform data verification, thereby minimizing errors in data comparison and improving the reliability of data comparison results.

In some optional embodiments, when the target comparison manner is the offline comparison manner, before the data comparison is performed, the method may further include the following steps:

Step b1: Detect whether the data of the heterogeneous data sources completes data synchronization.

Step b2: When the data of the heterogeneous data sources completes data synchronization, compare data within the data comparison watermark according to the target comparison manner to obtain the comparison result.

The offline comparison manner is to perform comparison for data sources for which data synchronization is completed. When data comparison is performed in the offline comparison manner, it is necessary to detect whether a data synchronization task is executed, that is, detect the execution progress of the data synchronization task. When it is determined that the data synchronization task is finished, data of different data sources is compared based on the data comparison watermark determined by using the data isomorphism benchmark to generate a corresponding data comparison result, and the data comparison result is pushed to a related person in charge.

In the above embodiment, because data synchronization is completed to ensure data integrity, when data comparison is performed in the offline comparison manner, the execution progress of the data synchronization task is detected to start data comparison after the data synchronization is completed, to compare data within the data comparison watermark, thereby ensuring the accuracy and idempotency of the data comparison result.

In some optional embodiments, the above method may further include the following steps:

Step c1: Obtain a trigger time corresponding to the offline comparison manner.

Step c2: When the trigger time is reached, compare data within the data comparison watermark according to the target comparison manner to obtain the comparison result.

The trigger time is a preset execution time for the offline comparison manner. For example, if a data synchronization task is completed at 11:00 PM the day before, it may be set to compare data for which data synchronization is completed at 9:00 AM every day:

Therefore, when the offline comparison manner is set with a corresponding trigger time, it is necessary to detect whether the trigger time is reached. When the data synchronization task is completed and the trigger time is reached, data of different data sources is compared based on the data comparison watermark determined by using the data isomorphism benchmark to generate a corresponding data comparison result, and the data comparison result is pushed to a related person in charge.

In the above embodiment, in the offline comparison manner, the data comparison process is started in combination with the set trigger time, thereby improving the data comparison flexibility of the offline comparison manner.

The method of comparing data of heterogeneous data sources provided in this embodiment determines the data comparison watermark in combination with the data isomorphism benchmark, so that data alignment of heterogeneous data sources can be implemented by setting the data comparison watermarks of the online comparison manner and the offline comparison manner. Then, data within the data comparison watermarks is compared through asynchronous monitoring of the data comparison watermarks, thereby ensuring the accuracy of data comparison results.

In this embodiment, an apparatus of comparing data of heterogeneous data sources is further provided. The apparatus is configured to implement the above embodiment and preferred implementation, which will not be repeated here. As used below; the term "module" may be a combination of software and/or hardware that implements a predetermined function. Although the apparatus described in the following embodiments is preferably implemented in software, an implementation of hardware, or a combination of software and hardware is also possible and contemplated.

Figure 4:
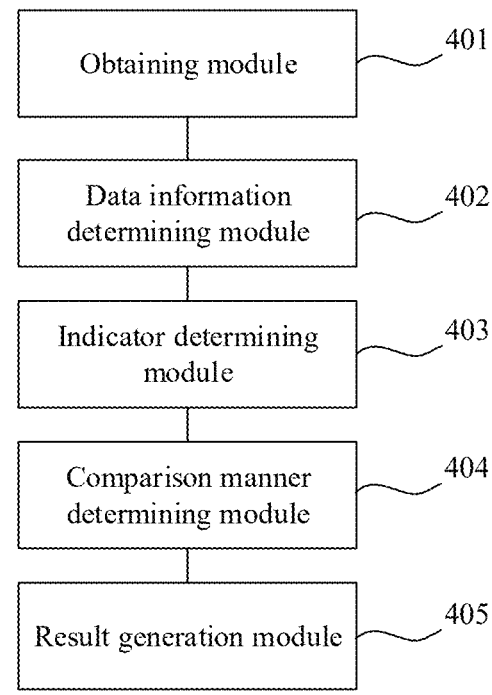
FIG. 4 is a block diagram of a structure of an apparatus of comparing data of heterogeneous data sources according to an embodiment of the present disclosure.

This embodiment provides an apparatus of comparing data of heterogeneous data sources. As shown in FIG. 4, the apparatus includes:

an obtaining module 401, configured to obtain first metadata and second metadata corresponding to heterogeneous data sources to be compared;

a data information determining module 402, configured to determine a data isomorphism benchmark from the heterogeneous data sources based on the first metadata and the second metadata, and determine a first target data table and a second target data table corresponding to the heterogeneous data sources;

an indicator determining module 403, configured to associate the first target data table with the second target data table to determine a comparison indicator of the heterogeneous data sources; and a comparison manner determining module 404, configured to determine, based on the first target data table and the second target data table, a target comparison manner between the first target data table and the second target data table.

a result generation module 405, configured to generate, according to the target comparison manner and the data isomorphism benchmark, a data comparison result corresponding to the comparison indicator.

In some optional embodiments, the first metadata comprises a first update frequency and a first data amount, the second metadata comprises a second update frequency and a second data amount, and the data information determining module 402 may include:

a first comparison unit, configured to compare the first update frequency and the second update frequency; to determine a first target data source with a slower update frequency;

a first determining unit, configured to determine the first target data source as the data isomorphism benchmark;

a second comparison unit, configured to compare the first data amount and the second data amount, and determine a second target data source with a large data amount; and a second determining unit, configured to determine the second target data source as the data isomorphism benchmark.

In some optional embodiments, the data information determining module 402 may further include:

a task creation unit, configured to create a data synchronization task for the heterogeneous data sources when the first update frequency and the second update frequency are greater than a preset frequency threshold, and/or the first data amount and the second data amount are greater than a preset data amount;

a first generation unit, configured to synchronize data of the heterogeneous data sources based on the data synchronization task, convert a data structure of the heterogeneous data sources into an offline data structure, to generate the first target data table and the second target data table with the offline data structure;

a component calling unit, configured to call a data source component corresponding to the heterogeneous data sources when the first update frequency and the second update frequency are less than the preset frequency threshold, and/or the first data amount and the second data amount are less than the preset data amount; and a second generation unit, configured to convert data of the heterogeneous data sources into an online data structure based on the data source component, to generate the first target data table and the second target data table with the online data structure.

In some optional embodiments, the indicator determining module 403 may include:

an associating unit, configured to associate the first target data table with the second target data table according to a preset template format to determine a data dimension and a data parameter; and an indicator determining unit, configured to determine the comparison indicator based on the data dimension and the data parameter.

In some optional embodiments, the result generation module 405 may include:

a watermark determining unit, configured to determine a data comparison watermark based on the data isomorphism benchmark; and a comparison unit, configured to perform data comparison on the comparison indicator within the data comparison watermark according to the target comparison manner to obtain the comparison result.

In some optional embodiments, when the target comparison manner is the online comparison manner, the indicator determining module 403 may further include:

a detection unit, configured to detect whether the comparison result meets a preset condition; and an alarm unit, configured to generate a real-time data monitoring alarm when the comparison result does not meet the preset condition.

In some optional embodiments, when the target comparison manner is the offline comparison manner, before the data comparison is performed, the indicator determining module 403 may further include:

a progress monitoring unit, configured to detect whether the data of the heterogeneous data sources completes data synchronization; and a first execution unit, configured to compare data within the data comparison watermark according to the target comparison manner to obtain the comparison result when the data of the heterogeneous data sources completes data synchronization.

In some optional embodiments, the indicator determining module 403 may further include:

a trigger unit, configured to obtain a trigger time corresponding to the offline comparison manner; and a second execution unit, configured to compare data within the data comparison watermark according to the target comparison manner to obtain the comparison result when the trigger time is reached.

Further function descriptions of the above modules and units are the same as those of the corresponding embodiments, which will not be repeated here.

The apparatus of comparing data of heterogeneous data sources in this embodiment is presented in the form of a functional unit. The unit herein refers to an ASIC circuit, a processor and a memory that execute one or more software or firmware programs, and/or another device that can provide the above functions.

The apparatus of comparing data of heterogeneous data sources provided in this embodiment determines a data isomorphism benchmark by analyzing metadata of the heterogeneous data sources, performs data processing on different data sources in the heterogeneous data sources based on the data isomorphism benchmark to generate corresponding target data tables, and then associates different target data tables to automatically determine a required comparison indicator and an adapted target comparison manner, thereby implementing data comparison of heterogeneous data sources according to the target comparison manner and generating a corresponding data comparison result. In this way, fully automatic data comparison testing is implemented without relying on manual work, thereby saving labor costs.

In addition, through automatic data comparison, data comparison efficiency is improved, errors in manual comparison are reduced, and data comparison accuracy is improved.

An embodiment of the present disclosure further provides a computer device, which has the apparatus of comparing data of heterogeneous data sources shown in FIG. 4.

Figure 5:
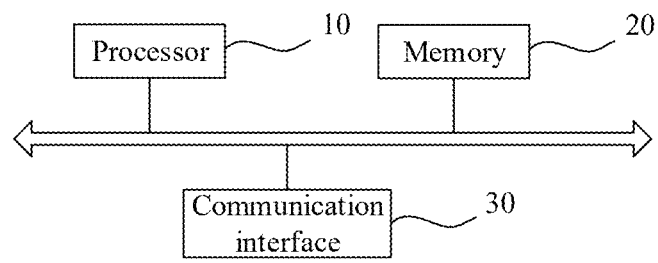
FIG. 5 is a schematic diagram of a hardware structure of a computer device according to an embodiment of the present disclosure.

Please refer to FIG. 5, which is a schematic diagram of a structure of a computer device according to an optional embodiment of the present disclosure. As shown in FIG. 5, the computer device includes one or more processors 10, a memory 20, and an interface for connecting various components, including a high-speed interface and a low-speed interface. The components communicate with each other through different buses and may be mounted on a common main board or otherwise as required. The processor may process instructions executed in the computer device, including instructions stored in or on the memory to display graphical information of a GUI on an external input/output apparatus (such as a display device coupled to the interface). In some optional implementations, if required, a plurality of processors and/or a plurality of buses may be used together with a plurality of memories and a plurality of memories. Similarly, a plurality of computer devices may be connected, and each device provides some necessary operations (for example, as a server array, a group of blade servers, or a multi-processor system). FIG. 5 shows one processor 10 as an example.

The processor 10 may be a central processing unit, a network processor, or a combination thereof. The processor 10 may further include a hardware chip. The above hardware chip may be an application-specific integrated circuit, a programmable logic device, or a combination thereof. The above programmable logic device may be a complex programmable logic device, a field programmable gate array, a general-purpose array logic, or any combination thereof.

The memory 20 stores instructions executable by at least one processor 10, so that the at least one processor 10 executes the method shown in the above embodiment.

The memory 20 may include a program storage area and a data storage area. The program storage area may store an operating system, an application program required for at least one function, and the data storage area may store data created according to the use of the computer device. In addition, the memory 20 may include a high-speed random access memory, and may further include a non-transitory memory, for example, at least one magnetic disk storage device, a flash memory device, or other non-transitory solid-state storage devices. In some optional implementations, the memory 20 may optionally include a memory remotely arranged relative to the processor 10, and the remote memory may be connected to the computer device through a network. Examples of the above network include, but are not limited to, the Internet, an intranet, a local area network, a mobile communication network, and a combination thereof.

The memory 20 may include a volatile memory, for example, a random access memory. The memory may also include a non-volatile memory, for example, a flash memory, a hard disk, or a solid-state hard disk. The memory 20 may further include a combination of the above types of memories.

The computer device further includes a communication interface 30 configured to communicate between the computer device and another device or a communication network.

An embodiment of the present disclosure further provides a computer-readable storage medium. The method according to the embodiment of the present disclosure may be implemented in hardware or firmware, or may be implemented as computer code that may be recorded in a storage medium, or may be implemented as original computer code stored in a remote storage medium through a network download and to be stored in a local storage medium, so that the method described herein may be stored in such software processing on a storage medium using a general-purpose computer, a special-purpose processor, or programmable or special-purpose hardware. The storage medium may be a magnetic disk, an optical disc, a read-only memory, a random access memory, a flash memory, a hard disk, a solid-state hard disk, etc. Further, the storage medium may further include a combination of the above types of memories. It may be understood that a computer, a processor, a microprocessor controller, or programmable hardware includes a storage component that may store or receive software or computer code, and when the software or computer code is accessed and executed by a computer, a processor, or hardware, the method shown in the above embodiment is implemented.

Although the embodiments of the present disclosure are described with reference to the accompanying drawings, those skilled in the art may make various modifications and variations without departing from the spirit and scope of the present disclosure, and such modifications and variations all fall within the scope defined by the appended claims.

We claim:

1. A method of comparing data of heterogeneous data sources, comprising:
    obtaining first metadata and second metadata corresponding to the heterogeneous data sources to be compared;
    determining a data isomorphism benchmark from the heterogeneous data sources based on the first metadata and the second metadata, and determining a first target data table and a second target data table corresponding to the heterogeneous data sources;
    associating the first target data table with the second target data table to determine a comparison indicator of the heterogeneous data sources;
    determining, based on the first target data table and the second target data table, a target comparison manner between the first target data table and the second target data table; and
    generating, according to the target comparison manner and the data isomorphism benchmark, a data comparison result corresponding to the comparison indicator;
    wherein the first metadata comprises a first update frequency and a first data amount, the second metadata comprises a second update frequency and a second data amount; and
    determining the data isomorphism benchmark from the heterogeneous data sources based on the first metadata and the second metadata comprises:
    comparing the first update frequency and the second update frequency, to determine a first target data source with a slower update frequency; and
    determining the first target data source as the data isomorphism benchmark;
    and/or
    comparing the first data amount and the second data amount, to determine a second target data source with a larger data amount, and
    determining the second target data source as the data isomorphism benchmark.

2. The method of claim 1, wherein determining the first target data table and the second target data table corresponding to the heterogeneous data sources comprises:
    in response to the first update frequency and the second update frequency being greater than a preset frequency threshold, and/or the first data amount and the second data amount being greater than a preset data amount, creating a data synchronization task for the heterogeneous data sources; and
    synchronizing the data of the heterogeneous data sources based on the data synchronization task, and converting a data structure of the heterogeneous data sources into an offline data structure, to generate the first target data table and the second target data table with the offline data structure.

3. The method of claim 1, wherein determining the first target data table and the second target data table corresponding to the heterogeneous data sources comprises:
    in response to the first update frequency and the second update frequency being less than a preset frequency threshold, and/or the first data amount and the second data amount being less than a preset data amount, calling a data source component corresponding to the heterogeneous data sources; and
    converting the data of the heterogeneous data sources into an online data structure based on the data source component, to generate the first target data table and the second target data table with the online data structure.

4. The method of claim 1, wherein the associating the first target data table with the second target data table to determine a comparison indicator of the heterogeneous data sources comprises:
    associating the first target data table with the second target data table according to a preset template format to determine a data dimension and a data parameter; and
    determining the comparison indicator based on the data dimension and the data parameter.

5. The method of claim 1, wherein generating, according to the target comparison manner and the data isomorphism benchmark, the data comparison result corresponding to the comparison indicator comprises:
    determining a data comparison watermark based on the data isomorphism benchmark; and
    comparing data within the data comparison watermark according to the target comparison manner to obtain the comparison result.

6. The method of claim 5, wherein in response to the target comparison manner being an online comparison manner and, after obtaining the comparison result, the method further comprises:
    detecting whether the comparison result meets a preset condition; and
    in response to the comparison result not meeting the preset condition, generating a real-time data monitoring alarm.

7. The method of claim 5, wherein in response to the target comparison manner being an offline comparison manner and, before comparing the data within the data comparison watermark according to the target comparison manner to obtain the comparison result, the method further comprises:
    detecting whether the data of the heterogeneous data sources completes data synchronization; and
    in response to the data of the heterogeneous data sources completing data synchronization, performing data comparison on the comparison indicator within the data comparison watermark according to the target comparison manner to obtain the comparison result.

8. The method of claim 7, further comprising:
obtaining a trigger time corresponding to the offline comparison manner; and
in response to the trigger time being reached, performing data comparison on the comparison indicator within the data comparison watermark according to the target comparison manner to obtain the comparison result.

9. A computer device, comprising:
a memory and a processor, communicatively connected to each other, wherein the memory stores computer instructions therein, and the computer instructions, when executed by the processor, cause the processor to:
obtain first metadata and second metadata corresponding to the heterogeneous data sources to be compared;
determine a data isomorphism benchmark from the heterogeneous data sources based on the first metadata and the second metadata, and determine a first target data table and a second target data table corresponding to the heterogeneous data sources;
associate the first target data table with the second target data table to determine a comparison indicator of the heterogeneous data sources;
determine, based on the first target data table and the second target data table, a target comparison manner between the first target data table and the second target data table; and
generate, according to the target comparison manner and the data isomorphism benchmark, a data comparison result corresponding to the comparison indicator;
wherein the first metadata comprises a first update frequency and a first data amount, the second metadata comprises a second update frequency and a second data amount; and
the computer instructions for determining the data isomorphism benchmark from the heterogeneous data sources based on the first metadata and the second metadata further cause the processor to:
compare the first update frequency and the second update frequency, to determine a first target data source with a slower update frequency; and
determine the first target data source as the data isomorphism benchmark;
and/or
compare the first data amount and the second data amount, to determine a second target data source with a larger data amount, and
determine the second target data source as the data isomorphism benchmark.

10. The computer device of claim 9, wherein the computer instructions for determining the first target data table and the second target data table corresponding to the heterogeneous data sources further cause the processor to:
in response to the first update frequency and the second update frequency being greater than a preset frequency threshold, and/or the first data amount and the second data amount being greater than a preset data amount, create a data synchronization task for the heterogeneous data sources; and
synchronize the data of the heterogeneous data sources based on the data synchronization task, and convert a data structure of the heterogeneous data sources into an offline data structure, to generate the first target data table and the second target data table with the offline data structure.

11. The computer device of claim 9, wherein the computer instructions for determining the first target data table and the second target data table corresponding to the heterogeneous data sources further cause the processor to:
in response to the first update frequency and the second update frequency being less than a preset frequency threshold, and/or the first data amount and the second data amount being less than a preset data amount, call a data source component corresponding to the heterogeneous data sources; and
convert the data of the heterogeneous data sources into an online data structure based on the data source component, to generate the first target data table and the second target data table with the online data structure.

12. The computer device of claim 9, wherein the computer instructions for associating the first target data table with the second target data table to determine a comparison indicator of the heterogeneous data sources further cause the processor to:
associate the first target data table with the second target data table according to a preset template format to determine a data dimension and a data parameter; and
determine the comparison indicator based on the data dimension and the data parameter.

13. The computer device of claim 9, wherein the computer instructions for generating, according to the target comparison manner and the data isomorphism benchmark, the data comparison result corresponding to the comparison indicator further cause the processor to:
determine a data comparison watermark based on the data isomorphism benchmark; and
compare data within the data comparison watermark according to the target comparison manner to obtain the comparison result.

14. The computer device of claim 13, wherein in response to the target comparison manner being an online comparison manner and, after obtaining the comparison result, the computer instructions further cause the processor to:
detect whether the comparison result meets a preset condition; and
in response to the comparison result not meeting the preset condition, generate a real-time data monitoring alarm.

15. The computer device of claim 13, wherein in response to the target comparison manner being an offline comparison manner and, before comparing the data within the data comparison watermark according to the target comparison manner to obtain the comparison result, the computer instructions further cause the processor to:
detect whether the data of the heterogeneous data sources completes data synchronization; and
in response to the data of the heterogeneous data sources completing data synchronization, perform data comparison on the comparison indicator within the data comparison watermark according to the target comparison manner to obtain the comparison result.

16. The computer device of claim 15, wherein the computer instructions further cause the processor to:
obtain a trigger time corresponding to the offline comparison manner; and
in response to the trigger time being reached, perform data comparison on the comparison indicator within the data comparison watermark according to the target comparison manner to obtain the comparison result.

17. A non-transitory computer-readable storage medium, storing computer instructions thereon, the computer instructions being configured to cause a computer to:
obtain first metadata and second metadata corresponding to the heterogeneous data sources to be compared;

determine a data isomorphism benchmark from the heterogeneous data sources based on the first metadata and the second metadata, and determine a first target data table and a second target data table corresponding to the heterogeneous data sources;
associate the first target data table with the second target data table to determine a comparison indicator of the heterogeneous data sources;
determine, based on the first target data table and the second target data table, a target comparison manner between the first target data table and the second target data table; and
generate, according to the target comparison manner and the data isomorphism benchmark, a data comparison result corresponding to the comparison indicator;
wherein the first metadata comprises a first update frequency and a first data amount, the second metadata comprises a second update frequency and a second data amount; and the computer instructions for determining the data isomorphism benchmark from the heterogeneous data sources based on the first metadata and the second metadata further cause the computer to:

compare the first update frequency and the second update frequency, to determine a first target data source with a slower update frequency; and determine the first target data source as the data isomorphism benchmark;

and/or compare the first data amount and the second data amount, to determine a second target data source with a larger data amount, and determine the second target data source as the data isomorphism benchmark.

* * * * *